United States Patent
Plesniak et al.

(10) Patent No.: US 6,211,848 B1
(45) Date of Patent: Apr. 3, 2001

(54) DYNAMIC HOLOGRAPHIC VIDEO WITH HAPTIC INTERACTION

(75) Inventors: Wendy Plesniak; Ravikanth Pappu, both of Cambridge; Stephen Benton, Lincoln, all of MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/252,591

(22) Filed: Feb. 9, 1999

Related U.S. Application Data

(60) Provisional application No. 60/085,611, filed on May 15, 1998.

(51) Int. Cl.[7] .................................................. G09G 5/00
(52) U.S. Cl. .................................. 345/1; 345/156; 359/9; 359/10; 359/630
(58) Field of Search ........................... 345/1, 173, 156; 359/10, 9, 11, 15, 16, 630

(56) References Cited

U.S. PATENT DOCUMENTS

| | | | |
|---|---|---|---|
| 4,367,486 | * 1/1983 | Eichenlaub | 358/88 |
| 5,172,251 | 12/1992 | Benton et al. | 359/9 |
| 5,220,409 | * 6/1993 | Bures | 356/375 |
| 5,291,321 | * 3/1994 | Noh | 359/30 |
| 5,589,956 | * 12/1996 | Morishima et al. | 359/15 |
| 5,642,209 | * 6/1997 | Baker | 359/10 |
| 5,926,294 | * 7/1999 | Sato et al. | 359/22 |
| 6,061,177 | * 5/2000 | Fujimoto | 359/443 |

OTHER PUBLICATIONS

Pappu et al., "A Generalized Pipeline for Preview and Rendering of Synthetic Holograms," Practical Holography XI (1997).

St.–Hilaire et al., Practical Holography VII, paper 1914–27 (1992).

Watlington et al., Practical Holography IX, paper #2406–23 (1995).

* cited by examiner

*Primary Examiner*—Richard Hjerpe
*Assistant Examiner*—Kimnhung Nguyen
(74) *Attorney, Agent, or Firm*—Testa, Hurwitz & Thibeault LLP

(57) ABSTRACT

A user is able to interact with and modify an electronic holographic image using a force-feedback (or haptic) device, which is capable of sensing and reporting the 3D position of its hand-held stylus and "displaying" appropriate forces to the user. Thus, a user can feel and modify specified shapes in the haptic workspace. The haptic workspace is precisely registered with the free-standing, spatial image displayed by a holographic video (holovideo) system. In the coincident visuo-haptic workspace, a user can see, feel, and interact with synthetic objects that exhibit many of the properties one expects of real ones, and the spatial display enables synthetic objects to become a part of the user's manipulatory space.

21 Claims, 5 Drawing Sheets

DYNAMIC HOLOGRAPHIC VIDEO WITH HAPTIC INTERACTION

RELATED APPLICATION

This application stems from U.S. Provisional application Ser. No. 60/085,611, filed on May 15, 1998.

FIELD OF THE INVENTION

The present invention relates to holography, and in particular to dynamic holographic systems offering interactive capability.

BACKGROUND OF THE INVENTION

A wide variety of virtual reality (VR) application areas such as telesurgery, training, computer modeling and entertainment employ computational haptics (i.e., computer-mediated manipulation and perception through tactile and kinesthetic senses) and high-quality computer graphics to study, interact with or modify data. Most present-day applications dissociate the visual and manual workspaces; that is, although the user can perceive an image of, for example, his or her hand in a virtual workspace, the user's actual hand is elsewhere. The result is a sensory disjunction: what the user sees is spatially separated from what the user feels. There have, however, been several efforts to conjoin eye and hand in interactive applications.

For example, the "Virtual Lathe" (Deering, "High Resolution Virtual Reality," *Proc. SIGGRAPH '92, Computer Graphics,* 26:195–202 (1992)) utilized a head-tracked stereo display showing a virtual stock, spinning about its long axis, which a person could interactively lathe using a 3D mouse in the shape of a rod. The demonstration used liquid-crystal display (LCD) shutter goggles for stereo viewing, and had no provision for force feedback.

Another interesting example is described in Yokokohji et al., "Vision-based Visual/Haptic Registration for WYSIWYF Display," *International Conference on Intelligent Robots and Systems* (1996) pp. 1386–1393. The visual display behaves like a moveable "magic window," interposed between the viewer's eyes and hand, and through which the hand can be seen interacting with a virtual, tangible scene. The work employs a six degree-of-freedom haptic manipulator and monographic visual rendering to combine three pieces of information in this final coincident display: a video image of the operator's hand/arm, the computationally rendered scene, and an accompanying force model. The visual display is a color LCD panel with a charge-coupled device (CCD) camera attached to its backplane. This display/camera unit can be moved with respect to the physical scene, with vision-based pose estimation employed to determine its new orientation. The visual display shows a computationally rendered view of the synthetic scene generated from the newly determined viewpoint, and composited with a live chroma-keyed image of the operator's hand/arm moving behind the display and interacting with the haptic device. This display cannot currently reproduce correct occlusion relationships between the hand/arm and virtual objects, however, and provides only monocular cues to scene depth (i.e., neither stereoscopic viewing nor head-tracked motion parallax is available).

Other systems employing a coincident workspace utilize a half-silvered mirror to combine an image displayed by a conventional monitor with that of the haptic workspace. One such project, the "Virtual Workbench," is described in Wiegand, "The Virtual Workbench & the Electronics Training Task," MIT internal communication (1994) (available at http://mimsy.mit.edu/). This system, used to study human sensorimotor capabilities and to develop training applications, employs a PHANTOM haptic interface and the half-silvered mirror technique for coincident stereoscopic display. It, too, does not represent correct occlusion relationships between the hand and simulated objects. Moreover, the workspace that can actually be shared by the visual display and the hand is depth-limited in stereoscopic systems; inherent in these displays is an accommodation-convergence mismatch—that is, a functional disengagement of several systems of the eye that normally function in cooperation. If scene depth is not designed well for the display's particular viewing geometry, eye strain, headaches and unfuseable stereo images can result. Of course, the very purpose of combining the manual and visual workspace is to visually monitor the hand (or hand-held tool) and its interaction with the object or material. Consequently, the ability to keep both the displayed object and the hand in visual focus is essential, and careful design must be employed to render it so.

Holographic displays eliminate this particular design problem by permitting a viewer to freely converge and accommodate to any point in the display volume. Indeed, throughout the history of holography, there has been considerable interest in building real-time, interactive holographic displays. The problem has been recognized as a difficult one and it is only very recently that quasi real-time holographic displays have made their appearance; see, e.g., Kollin et al., "Real-Time Display of 3D Computed Holograms by Scanning the Image of an Acousto-Optic Modulator," in *SPIE Proc. Vol. #1136, Holographic Optics II. Principles and Applications* (1989), paper #1136-60; St. Hilaire, "Scalable Optical Architectures for Electronic Holography," Ph.D. Thesis, MIT Program in Media Arts and Sciences, Massachusetts Institute of Technology, 1994 (hereafter "St. Hilaire"); and U.S. Pat. No. 5,175,251. Making these displays interactive has of proved to be a challenging engineering problem owing to the large computation, communication, and modulation bandwidths involved. The most recent incarnation of holovideo is capable of displaying up to three pre-computed 36-Mbyte holograms per second. Computing a single hologram still requires about five seconds on our fastest computing hardware. These computational and display update rates still fall short of those required for real-time interactivity.

The combination of haptics and holography was investigated for an object inspection task as described in Jones, "The Haptic Hologram," *Proceedings of SPIE, Fifth International Symposium on Display Holography* 2333:444–447 (1994). Visual display was provided by a reflection-transfer hologram which presented an aerial image of a control valve. A computer-ontrolled tactile glove (CCTG) provided coincident haptic display of the same data. Reflection holograms, however, allow the interacting hand to block the illuminating light and thereby interfere with image reconstruction.

That problem was addressed by employing full-parallax edge-illuminated holograms in combination with the PHANTOM for the inspection of static 3D models (see Plesniak, et al., "Tangible holography: adding synthetic touch to 3D display," in *Proceedings of the IS&T/SPIE's Symposium on Electronic Imaging, Practical Holography XI* (1997). The edge-illuminated hologram format allowed hand movements in any part of the visual workspace. Thus a viewer could haptically explore the spatially registered force model while visually inspecting the holographic image details over a wide field of view. All of these displays were static, however; no dynamic modification could be made to the image presented.

DESCRIPTON OF THE INVENTION

Brief Summary of the Invention

The present invention combines the three-dimensional realism of holography with force feedback and dynamic interaction. In particular, by utilizing a limited-parallax computed holographic display and by making only local changes to the hologram, the present invention enables a user to rapidly interact with and modify an electronic holographic image using a force-feedback device and both general and special-purpose hardware. In general, hardware constraints favor generation of holograms with parallax (i.e., the change in the apparent relative orientation of the holographically depicted object as the viewing angle changes) extending along a single dimensional axis. For example, in a horizontal parallax only (HPO) system, the relative orientation of the depicted object changes only in response to the viewer's horizontal movement; vertical characteristics remain unchanged. Of course, as faster holographic rendering hardware becomes available, the invention can be straightforwardly adapted to provide full parallax.

Along the axis of parallax, the holographic nature of the visual display ensures that the change in apparent orientation of the image occurs immediately as the user moves within the view zone. There is no need, as with prior systems, to track the user's head, compute a new object orientation, and re-render the display in accordance therewith. Furthermore, no special eyewear is necessary to perceive the inherently stereoscopic information.

Accordingly, the invention facilitates user interaction with a holographic image. The invention renders a holographic image within a view zone and senses interaction between a user-manipulated object—such as a hand-held implement, or the user's hand or finger—in the view zone and the holographic image. Based on the sensed interaction, the invention imparts a force to the object and alters the holographic image appropriately. The invention may model the physical characteristics of the subject matter displayed holographically and utilize this model to govern the force imparted to the object.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF AN ILLUSTRATIVE EMBODIMENT

The ensuing discussion describes an embodiment of the invention in which a single multimodal image is presented in a workspace using an HPO holographic video modeling system. The user interacts with the holographic image using a stylus or other manual implement configured to "display" or impart a force to the user—that is, to resist the user's effort to move the implement—to a degree dictated by a model of the physical characteristics of holographically displayed subject matter, and by the position of the implement relative to the image. This allows a user to feel and modify computationally specified shapes in the haptic workspace (i.e., the space which is capable of being addressed by the force-feedback device). The haptic workspace is precisely registered with the free-standing spatial image displayed by holovideo. The combined visuo-haptic workspace is referred to as the "coincident workspace" wherein a user can see, feel, and interact with synthetic objects that exhibit many of the properties one expects of real objects. In other words, the coincident workspace contains a holographic visual image and a force image that physically models the depicted object.

Figure 1:
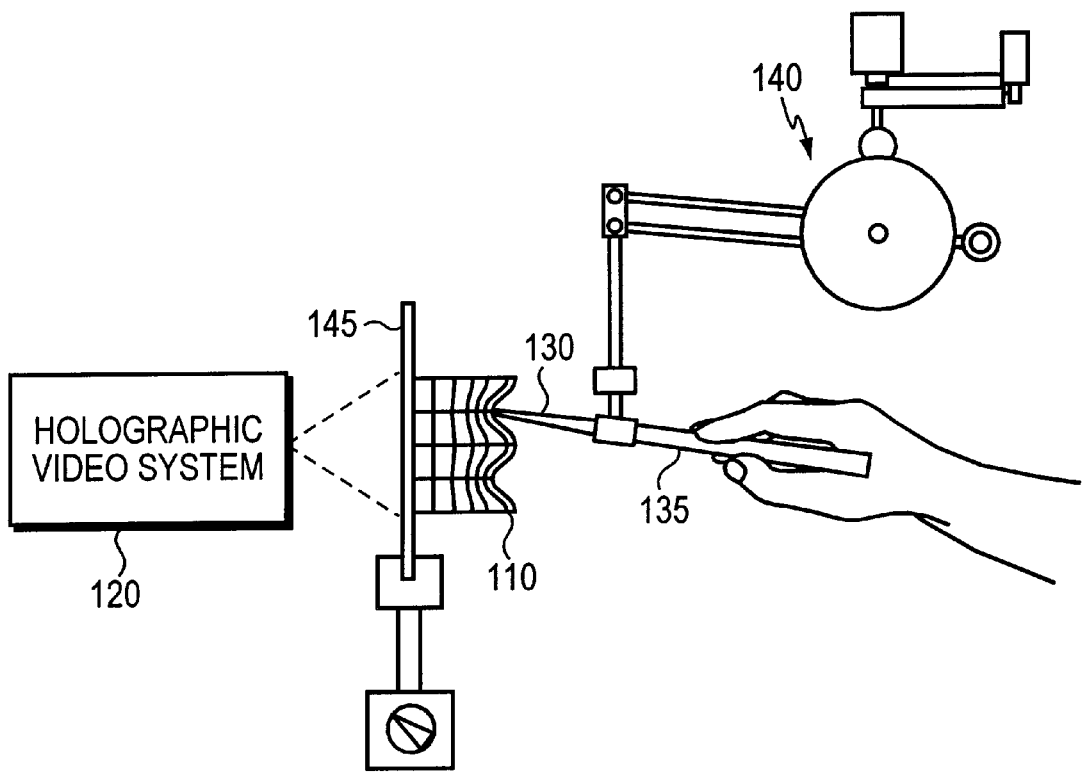
FIG. 1 is an elevational view of a system operating in accordance with the present invention.

In the implementation shown in FIG. 1, the image 110 of a spinning cylinder to be interactively "carved" is presented. The image 110 is generated and displayed by a holographic video system as described below. The image 110 has an apparent position and volume within a view zone visible to the user. Interaction between the user and the image 110 takes place at a stylus tip 130 attached to a hand-held stylus 135. Stylus 135, in turn, is the interface to a haptic device 140. The stylus 135, tip 130, and haptic device 140 represent a force-feedback system. A preferred force-feedback system is the PHANTOM, a three degree-of-freedom (d.o.f.) mechanical linkage with a three d.o.f. passive gimbal that supports stylus 135. It is capable of sensing and reporting the three-dimensional position of the stylus tip 130 and "displaying" a force to the user's hand.

The user sees stylus tip 130 interacting with the holographic image 110 while feeling forces that result from contact with a "haptic model" (as described below) that represents the surface and deformation characteristics specific to the presented image 110. Consequently, as the user pushes stylus tip 130 into the volume of the haptic model, this model is deformed according to the amount of penetration; the change in the model is then reflected in the HPO holographic image. As a result, the multi-model (i.e., haptic and visual) cylinder representation can be interactively shaped in a non-volume-conserving way. Because the computational model of the image 110 is stored in memory, the model can be dispatched to a "3D printer" to produce physical hardcopy (i.e., a solid model) of the design.

Figure 2:
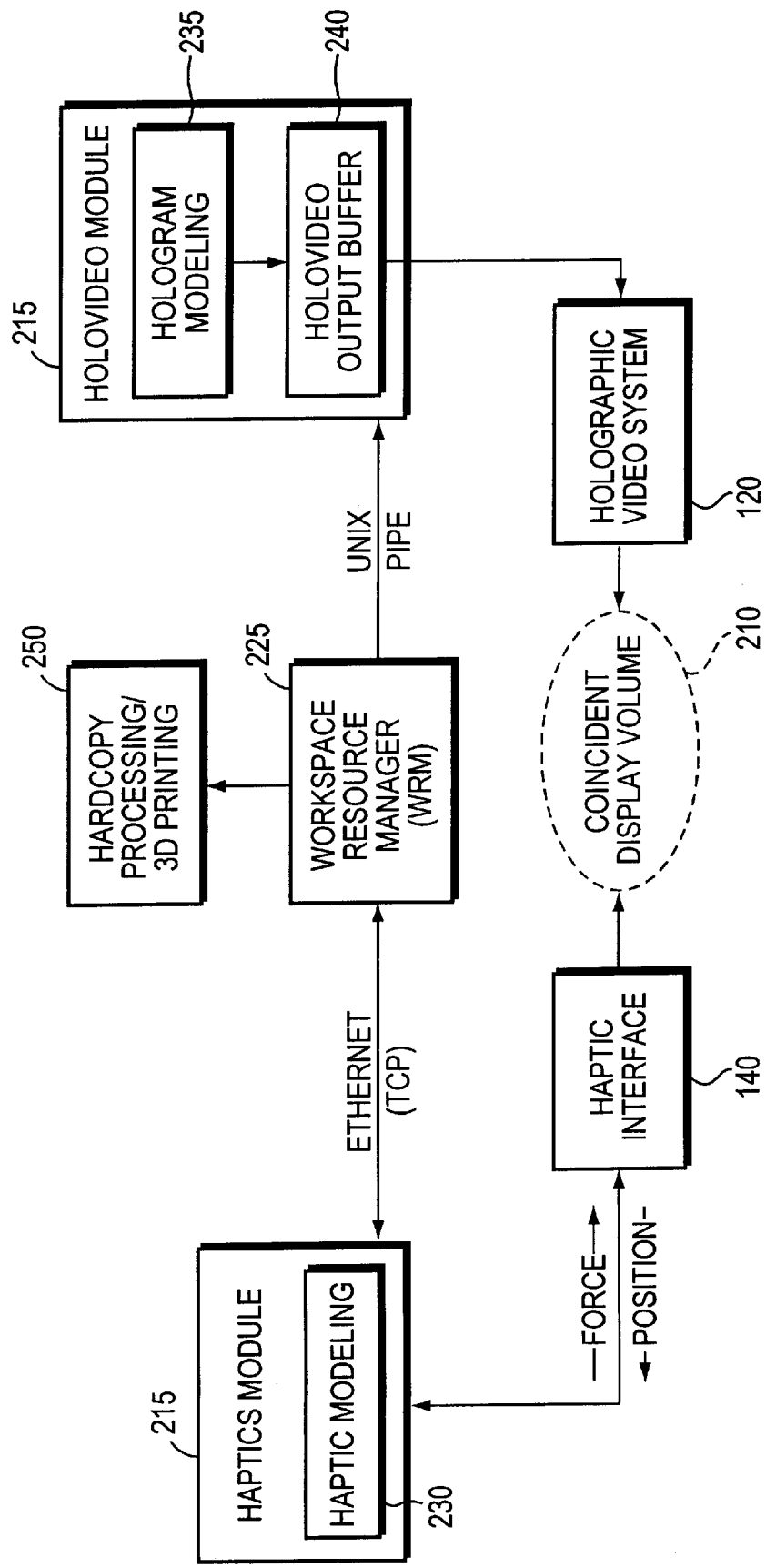
FIG. 2 schematically illustrates the primary components of the present invention.

With reference to FIGS. 1 and 2, the components of the invention that feed the force and visual images displayed in the coincident display volume 210 may be implemented in two separate modules: a haptics module 215 that performs force modeling, and the holovideo module 220 that pre-computes holograms and drives rapid local holographic display updates based on changes to the model. The haptics and hologram modules are controlled and organized by the workspace resource manager (WRM) 225, which receives the changes carved into the haptic model and uses these to calculate corresponding changes in the visual model.

The components and operation of the invention will now be described in greater detail.

1. Haptics

Haptics module 215 also contains a computationally represented haptic model 230 describing the model's position, geometry, bulk deformation, and tactile properties. Haptics module 215 correlates the instantaneous physical position of stylus tip 130 with this haptic model to derive the force imparted to tip 130 when it is in contact with the model, and displays that force via the haptic device 140. Haptics module 215 also computes the geometry changes imparted to the haptic model by the user's hand, and communicates these changes to the WRM 225. In turn, WRM 225 requests that hologram updates be made to local regions of the visual display where these changes should be seen. Again, while the haptics and holovideo modules rely on separate and characteristically different representations of the rendered object, these are carefully spatially and metrically registered. From the point of view of the user, who is holding the stylus 135 and pressing stylus tip 130 into the holographic image, a unified multimodal representation of the simulation can be seen and felt changing in response to the applied force.

The haptic modeling techniques used herein are well understood in the art, and the contents of haptic model 230 are conventional. Currently implemented computational haptics are able to render both the feel of a material interacting and its bulk properties with reasonable fidelity. The haptic cylinder 110, initially and in subsequent stages of "carving," may represented as a surface of revolution with two caps having a defined mass of 1 gram, a computationally defined vertical grating as surface texture, static and dynamic frictional properties, stiff-spring bulk resistance, and rotating about its vertical axis at one revolution per second. The cylinder model straddles a static haptic plane (which spatially corresponds to the physical output plane 145 of the holovideo optical system); the haptic plane is modeled with the same bulk and frictional properties as the cylinder. The haptic modeling simulation may be run on a Pentium PC with an average servo rate of 1500 Hz.

The radius profile of the cylinder's surface of revolution may represented as a cubic B-spline curve with 28 control points, all of which are initially set to the same radius value (e.g., 25 mm) so that the initial image 110 is a cylinder. The curve evaluated between the middle 21 points defines the profile of the cylinder body; the remaining top three and bottom four points lie beyond the actual extent of the cylinder, and serve to "lock" the shape at its top and bottom, respectively. Control points are modified as force is exerted on the shape at a height h, between a pair of control points $P_i$ and $P_{i+1}$. A new radius for the surface of revolution at this height may be computed by evaluating the nonuniform, rational B-spline formulation.

Haptic model 230, operating on haptic interface 140, allows the user to feel cylinder 110 spinning beneath the user's touch, and when pressed with enough force (i.e., when the surface has been penetrated by some threshold distance $\Delta$), the surface of cylinder 110 deforms. The surface model may be as complex as desired, consistent with the implied physical characteristics of cylinder 110. In a simple embodiment, the two control points straddling the penetration location are displaced toward the central cylinder axis by a fraction of the penetration distance. The upper point is displaced by $tk\Delta$, and the lower by $(1-t)k\Delta$, where t is the normalized distance between the contact point and the lower control point used in the B-spline formulation. The closer control point is displaced by a greater distance. If contact occurs directly on a control point, then that point alone is displaced by $k\Delta$. Thus, control point displacement modifies the circumference of the cylinder at height h, as force is interactively applied.

The parameters k and $\Delta$ can be adjusted to make carving the rotating cylinder 110 require more or less applied force. A minimum radius (e.g., 15 mm) may be enforced, so that once the surface has receded to this point, the control points update no further. A control point density of 4.17 points/cm has been experimentally determined to be high enough to accommodate local model changes, yet sparse enough to avoid deep notching of the haptic surface (which makes the haptic simulation unstable).

2. Holographic Video

Holographic video system 120 is preferably an electronic holography apparatus as described, for example, in St. Hilaire; Pappu et al., "A Generalized Pipeline for Preview and Rendering of Synthetic Holograms," *Practical Holography XI* (SPIE 1997); and Watlington et al., "A Hardware Architecture for Rapid Generation of Electro-Holographic Fringe Patterns," *Practical Holography IX* (SPIE 1995). The entire disclosures of these references are hereby incorporated by reference. Holographic video system 120 displays holograms that are represented computationally and generated visually by holovideo module 220.

In general, optical holography utilizes the physical phenomena of interference and diffraction to record and reconstruct a three-dimensional ("3D") image. A holographic fringe pattern has a feature size on the order of the wavelength of visible light, and therefore diffracts light. In computational holography, the fringe pattern is represented as an array of discrete samples, which are used to modulate a beam of light and produce an image. Because the sampling rate (or pitch) must be sufficient to accurately represent the visual holographic information, a numerically computed fringe pattern contains an enormous number of samples—typically more than 20,000 samples/cm on a single line (or "hololine") of the hologram. Consequently, a real-time electro-holographic (or "holovideo") display requires the computation of fringe patterns containing millions of samples.

To permit computation of fringe patterns in real time by currently available equipment, the sample count is generally reduced, e.g., through elimination of vertical parallax. This allows each hololine to be computed and displayed independently. An SLM responds to the holovideo data, modulating light in accordance with the computed fringe pattern. In a representative system, described in the references noted above, the SLM is an 18-channel acousto-optic modulator ("AOM"), which is used in conjunction with a series of lenses and scanning mirrors to assemble a 3D holographic image at video-frame rates. Holographic fringe patterns are frequency shifted, amplified, and fed to the AOM transducer, which converts the electrical signals into a phase modulation that propagates down the AOM crystal as shear waves. Because the AOM is a one-dimensional device, it is intrinsically well-suited to display of HPO holograms.

Fringe-patterns are generated in accordance with the present invention by a hologram model 235, which is discussed in greater detail below. The fringe pattern is stored in an output buffer 240 and provided to holographic video system 120 for display. A representative system 120 receives 18 parallel signals representing the 18 lines of the fringe pattern. These signals are fed to the input terminals of a pair of cross-fired AOMs. The complete fringe pattern consists of 144 lines, which are equivalent to 37,748,736 samples (36 MSamples). Each channel has a typical data rate of 110 MSamples/sec. At any instant, as 18 lines of the holographic pattern traverse the aperture of the AOMs in the form of acoustic waves, a portion equal to roughly 1000 samples (in each channel) modulates the phase of the wavefront of laser light passing through each AOM channel. Two lenses image the diffracted light at a plane in front of the viewer. The light is reflected off a synchronized horizontally scanning mirror system in order to cancel the apparent motion of the holographic pattern. The scanning mirror system also angularly multiplexes the image of the acoustic wave, extending the apparent width of the imaged holographic pattern to 262,142 samples (256 KSamples).

The display produces a real 3D image located just in front of the output lens of the system 120, which is capable of displaying monochromatic, HPO images in a volume of 150 mm×57.5 mm×150 mm, with a viewing zone—i.e., the range of eye locations from which the viewer may perceive the images—of 30° horizontal. The 3D image produced by holographic video system 120 supports the most important depth cues: stereopsis, motion parallax, occlusion, and many pictorial and physiological cues to depth.

3. Workspace Resource Management

The Workspace Resource Manager (WRM) 225, which may run on an ONYX workstation (supplied by Silicon Graphics Corp.), initializes its own model of the surface of revolution, which starts as a cylinder of desired height and radius. WRM 225 initiates the haptic simulation by making client calls to the haptics module 215 (over, for example, an ethernet line using the Transmission Control Protocol, or "TCP"). These calls instruct haptic model 230 to create a haptic cylinder of the same height and radius at a desired location. Haptics module 215 commences physical simulation of this spinning cylinder, and computes collisions of stylus tip 130 with the computational model based on the known haptic model location and geometry, and the position information supplied by haptic interface 140. Based on these collisions, forces are computed and displayed to the operator's hand by means of commands transmitted to haptic interface 140, and any resulting shape modifications are reflected in the model update. Thus, updates to the haptic model do not occur unless sufficient force is applied by the operator to allow stylus tip 130 to allow it to penetrate into the interior of the haptic model, and that force is based on the modeled physical characterstics of the represented cylinder.

Changes in the cylinder's underlying B-spline representation resulting from interaction with the haptic model are automatically communicated by haptics module 215 to WRM 225 approximately 30 times per second. The transmitted information contains the location where a change begins on the curve (i.e., the number of the bottommost control point), as well as values of the six affected control points, ordered from bottom to top. It is assumed that model changes occur reasonably slowly, so that no more than six control points need be updated within 0.033 second. Since computing a deformation means updating at most two control points surrounding the point of contact, this communication rate can only guarantee reporting of accurate model changes from contact in a region 6.9 mm high within an update interval. Though this constraint is ordinarily adequate for normal interaction speed, the ability to communicate a variable number of control points to reflect the precise region of change would be more desirable.

Once WRM 225 receives an update message from haptics module 215, WRM 225 uses the changed control points to update its own internal representation of the radius profile of cylinder 110. WRM 225 determines which lines of the holovideo display will be affected by the updated region of the radius profile. Since the final holographic image will span 120 lines of the display, WRM stores and updates a state vector, R, with 120 elements whose values represent the exact radii of the surface of revolution at corresponding display lines. A set of six holovideo display lines correspond to the space between any two adjacent control points in the cylinder representation. The number of changed control points determines how many of the display lines must be recomputed. This depends on exactly which model control points are displaced. In regions near the top or bottom of the carved shape, a smaller region of the curve contributes to the visible extent of the shape, so fewer display lines will require change. Generally, if n control points have changed, it is necessary to recompute radii for the display lines spanning n+2 control points. The new radius values are reflected in the state vector R.

Figure 3A:
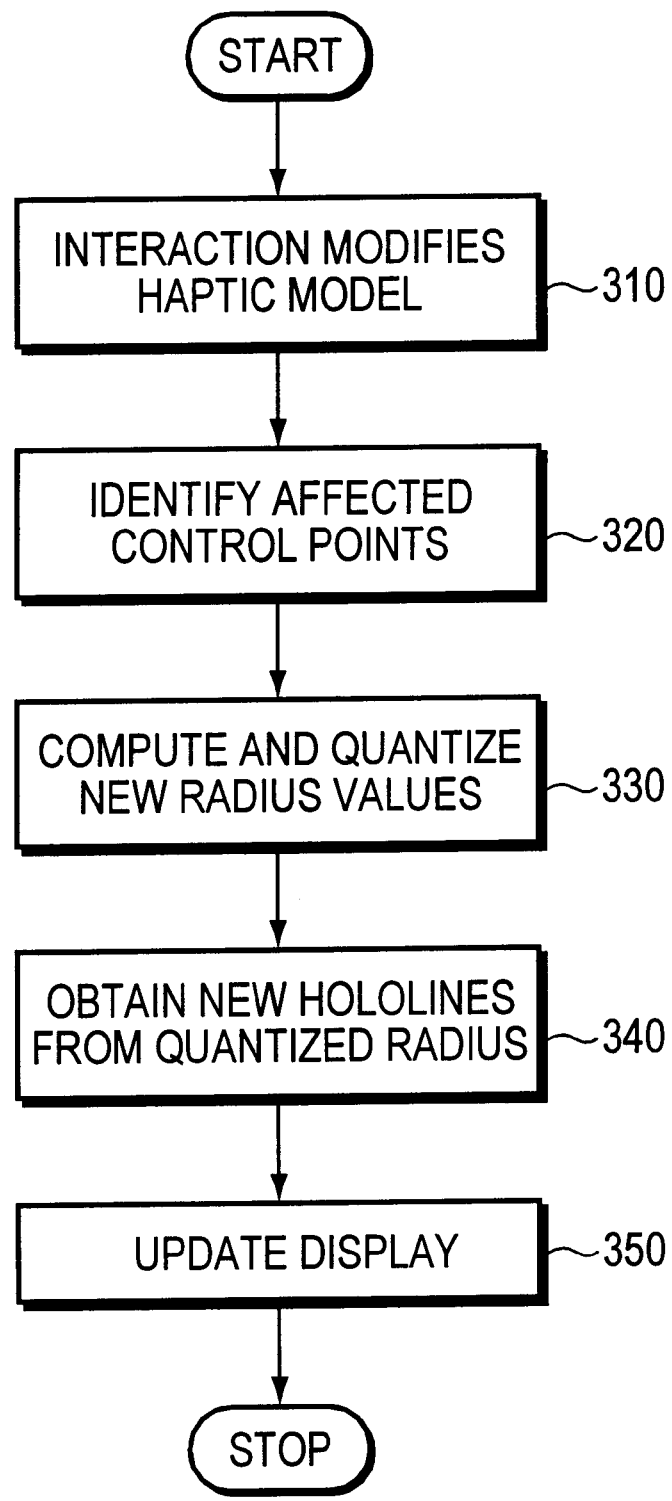
FIGS. 3A and 3B graphically and pictorially show the update process for modifying the holographic display in response to user interaction with the holographic image.
Figure 3B:
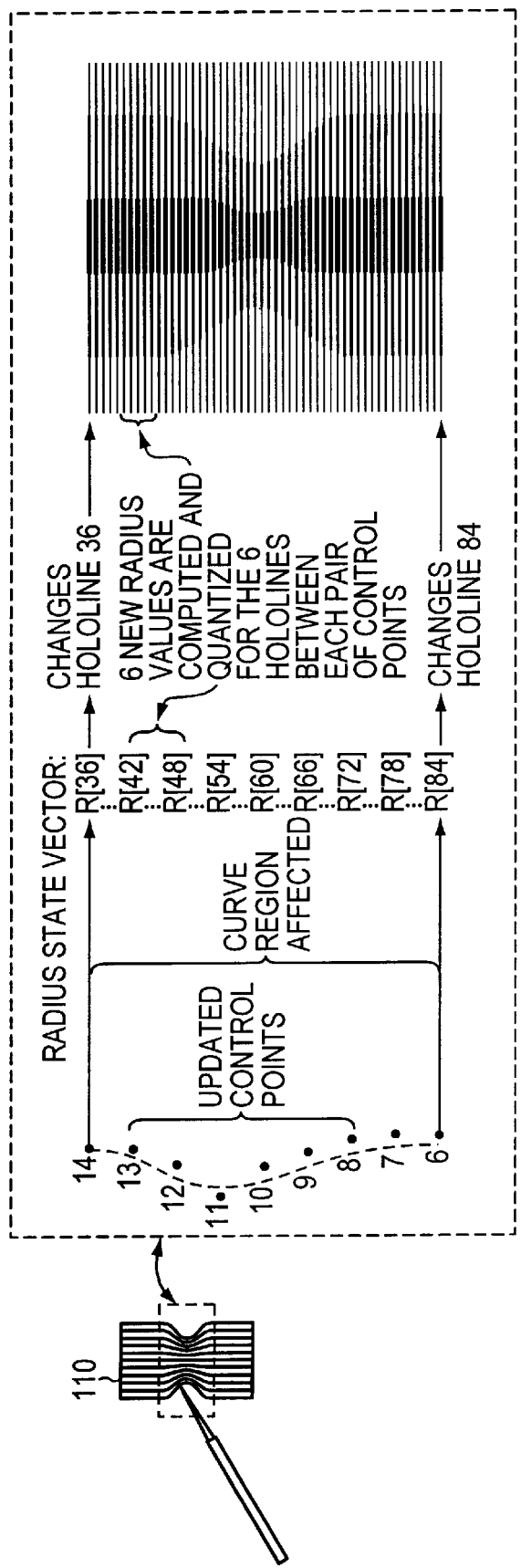

The update process is illustrated in FIGS. 3A and 3B. The process begins with modification of haptic model 230 (step 310) as a result of user interaction with cylinder 110. In step 320, haptics module 215 identifies the affected control points, and communicates this to WRM 225. If, as illustrated, six control points (nos. 8–13, corersponding to display lines 42–72) have changed, it is necessary to recompute radii for the 48 display lines spanning eight control points (nos. 6–14, corresponding to display lines 36–84). WRM 225 recomputes the new radii in step 330, modifying the values of R(36) through R(84). If desired, the recomputed cylinder can be rendered to a graphics display (using, for example, the Graphics Library supplied by Silicon Graphics Corp.) for debugging purposes, and to provide a means for remotely monitoring a user's performance.

Figure 4:
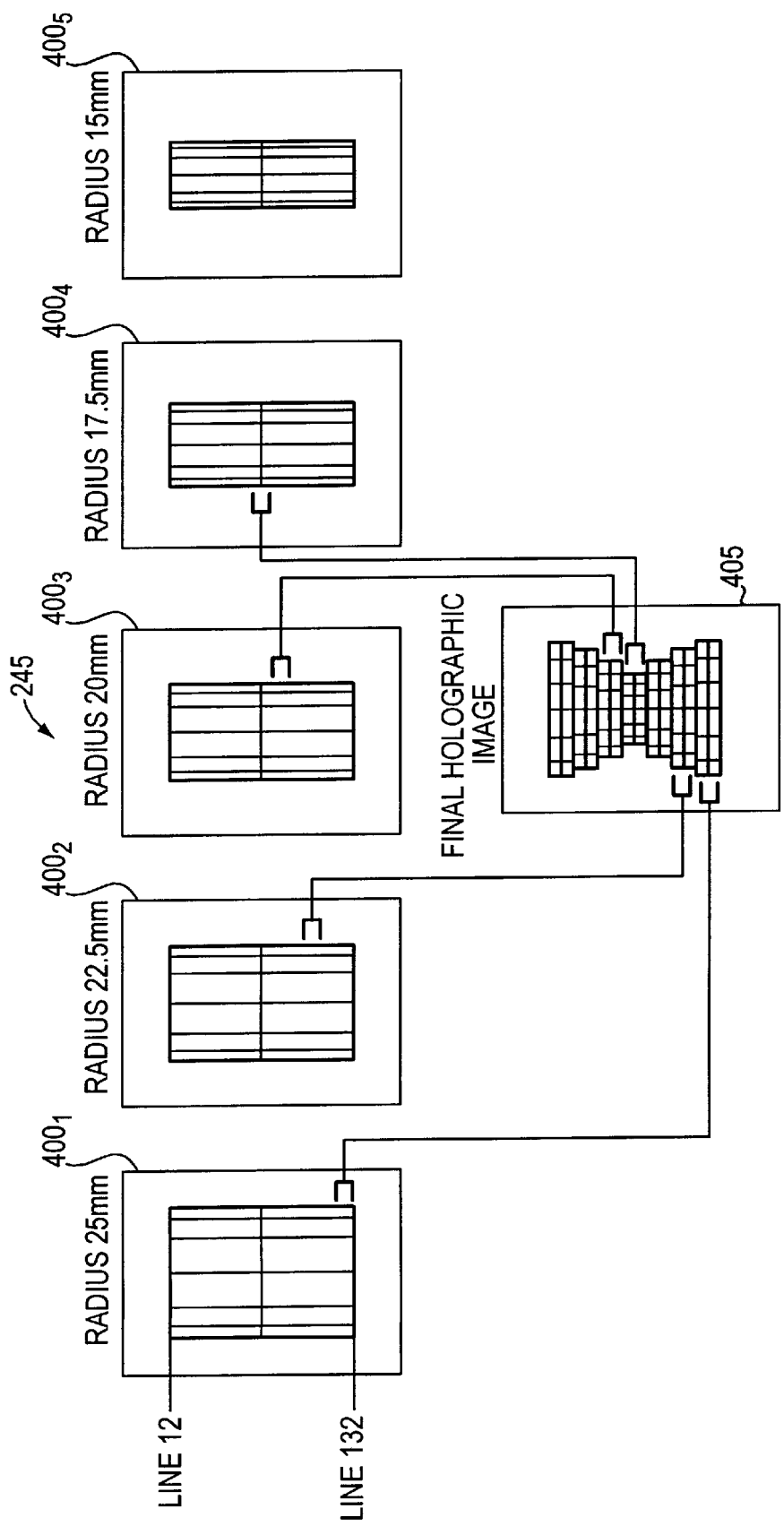
FIG. 4 illustrates quantization of the depicted holographic representation.

Because currently available equipment does not facilitate real-time computation of 36-Mbyte holograms, it is preferred to store pre-computed cylinder holograms of different radii in the memory of holographic video system 120, and to quantize the recomputed radii to one of the stored values. With reference to FIG. 4, the memory 240 of holovideo module 220 may contain stored fringe patterns representing five different cylinders: the initial cylinder 400$_1$ (25 mm) and four progressively smaller ones, 400$_2$ (22.5 mm), 400$_3$ (20 mm), 400$_4$ (17.5 mm), and 400$_5$ (15 mm). All holographic cylinders are 47.9 mm high. It would be possible to compute a fewer total number of lines by omitting visual texture from the object or restricting texture to be periodic.

Thus, at system start-up, cylinder 400$_1$ is displayed. As this initial haptic cylinder is carved, a visual approximation to the resulting surface of revolution is assembled on the display by loading the appropriate lines from each of the five separate holograms 400$_1$–400$_5$ to form a final image 405.

When the new radius values in R, corresponding to changed display lines, are quantized to match one of the set of five holographic cylinder radii, each is assigned a radius code for indexing purposes as shown in the following table:

TABLE 1

| radius (mm) | 25.0 | 22.5 | 20.0 | 17.5 | 15.5 |
|---|---|---|---|---|---|
| code | 5 | 4 | 3 | 2 | 1 |

WRM 225 communicates a message, which contains the number of the hololine marking the start of the update region, the number of lines that need to be updated, and the radius codes of each new line, to holovideo module 220 (e.g., via a UNIX pipe). In order to minimize the display update time, the current embodiment updates a maximum of 32 hololines per cycle, which represents a compromise in accuracy; for example, in the situation depicted in FIG. 3, only the display lines between the six affected control points (8–13) sent by haptics module are updated.

Upon receiving the update message, holovideo output module 220 instructs holographic video system 120 to fetch the appropriate hololines from the stored cylinder representations (step 340) and to display these (step 350). This is accomplished by indexing into the appropriate memory location using the radius code to determine the correct cylinder to display, and then writing the corresponding hololine to the output hardware. The final holographic image 405 is assembled using hololines from the five individual holograms 400$_1$–400$_5$ as appropriate, given the user's interaction with the cylinder. It should be noted that this method of hologram assembly is valid only for HPO holograms; for full-parallax holograms, it would be necessary to recompute the entire hologram. In the absence of the computation and communication bandwidth necessary to update fully computed holograms in real-time, however, pre-computed hologram indexing as described above enables rapid, local updating.

Following user interaction with the display, WRM 225 may be instructed to send data representing the finished holographic image to a 3D printer 250 (FIG. 2).

4. System lag and latency

A compelling multimodal representation depends heavily on minimizing, to imperceptible levels, the time lag between changes effected in the haptic model and holographic display of those changes. A reasonable visual update rate (20+ frames per second) is not possible with currently available holovideo systems, principally due to the speed with which holographic video system 120 can communicate and update the display. The effect of the resulting system lag, on the order of 0.5 sec, is that an operator can see the stylus tip penetrating into the holographic surface before the surface is apparently subtracted away. Higher bandwidth SLMs, efficient data compression techniques, improvements in computation speed, and higher-bandwidth data pipelines will help diminish this problem.

Because the visual display is holographic, the full range of horizontal parallax is always available in the viewzone; no visual lag is encountered with motion of the operator's head. Additionally, no special eyewear is necessary to perceive the stereo information.

Additionally, there is also some latency in the foregoing system. Both latency and lag are principally due to the fact that the display routine must receive and act on a message from a different machine. Some improvement in performance may be achieved by sending the updated hololines directly to the holographic video system 120 via a high-bandwidth link and directly displaying them. This would not, it should be stressed, require maintaining an expensive open connection between WRM 225 and holographic video system 120.

5. Sensory conflicts

In this overlapping workspace format, some more subtle conflicts between what is seen and felt can arise. The effects that most degrade the desired impression of the hologram/haptic simulation as a single multimodal event are spatial misregistrations and occlusion violations. At the moment when an operator feels the stylus tip in contact with the displayed surface, the visual discrepancy is striking if the tip is seen either penetrating the surface or not making contact at all due to misregistration of the visual and haptic output. Owing to the lag present in the holovideo pipeline, the above implementation may be vulnerable to this problem when the operator is actively carving the surface.

Allowing interaction between the output of optical projection systems, like holograms, and an operator's hands (plus physical objects or instruments), permits object depth relationships to occur which violate occlusion rules obeyed by the physical world. Normally, when one observes the image of one object blocking the image of another from view, it is understood that the occluded object is farther away. With reference to FIG. 1, it is possible with our system to interpose part of the stylus tip 130 between the holographic image 110 and the physical output plane 145 of the holovideo optical system, thus blocking the image 110 from the line of sight between the viewer and stylus tip 130. In this event, it appears that the farther object (stylus tip 130) occludes the nearer (holographic image 110). This anomalous cue is strong enough to confuise perception, even when correct depth reporting from stereopsis and motion parallax is available.

Although the described system has been implemented to represent haptic interaction with a rotating cylinder, it should be clear that this is solely for exemplary purposes, and that the present invention would be capable, with improvements in computing and framebuffer hardware, of facilitating interaction with virtually any depicted holographic representation. Furthermore, while various compromises have been made in order to accommodate the limitations of available hardware, it must be recognized that these compromises are expediential in nature and straightforwardly omitted for systems employing more advanced hardware. Similarly, we have described various operating limitations in order to teach their amelioration by improved hardware, and to emphasize that they stem from the constraints imposed by available equipment rather than limitations of the inventive concept.

It will therefore be seen that we have devised a dynamic holographic video system that incorporates real-time haptic interaction. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A holographic imaging system comprising:
   a. means for rendering a holographic image within a view zone;
   b. means facilitating manual interaction with the holographic image, said means comprising:
      i. means for sensing interaction between a user-manipulated object in the view zone and the holographic image;
      ii. means for imparting a force to the object based on the interaction; and
      iii. means for causing the rendering means to alter the holographic image based on the interaction.

2. The system of claim 1 wherein the interaction-sensing means comprises:
   a. means for periodically sensing a three-dimensional position of the object within the view zone; and
   b. means for correlating each sensed position with the holographic image to derive an apparent position of the object with respect to the holographic image.

3. The system of claim 1 wherein the object is a hand-held implement.

4. The system of claim 1 wherein the object is a user's hand or portion thereof.

5. The system of claim 1 wherein the holographic image comprises a virtual object having surface and deformation characteristics, and further comprising means for operating the force-imparting means in accordance with a haptic model of the virtual object specifying the object characteristics.

6. The system of claim 1 wherein the rendering means comprises:
   a. computational means for generating data representing a holographic fringe pattern; and
   b. a spatial light modulator for generating a holographic image within the view zone from the fringe data.

7. The system of claim 6 wherein the holographic image comprises a series of hololines and exhibits parallax along a single dimension.

8. The system of claim 7 wherein the rendering means further comprises:
   a. a computer memory for storing data representing a plurality of fringe patterns, each fringe pattern corresponding to a different rendering of the image; and
   b. means, responsive to the altering means, for assembling from the stored fringe pattern a composite holographic image that reflects the interaction.

9. The system of claim 7 wherein the sensing means identifies hololines of the image affected by the interaction and, for each affected hololine, a specification of a new hololine that reflects the interaction, the altering means changing the identified hololines in accordance with the specifications.

10. The system of claim 2 wherein the altering means causes the holographic image to be altered only if the object penetrates at least a threshold distance into the holographic image.

11. A method of facilitating interaction with a holographic image, the method comprising the steps of:
   a. rendering a holographic image within a view zone;
   b. sensing interaction between a user-manipulated object in the view zone and the holographic image;
   c. imparting a force to the object based on the interaction; and
   d. causing the rendering means to alter the holographic image based on the interaction.

12. The method of claim 11 wherein the sensing step comprises:
   a. periodically sensing a three-dimensional position of the object within the view zone; and
   b. correlating each sensed position with the holographic image to derive an apparent position of the implement with respect to the holographic image.

13. The method of claim 11 wherein the holographic image comprises a virtual object having surface and deformation characteristics, the imparted force reflecting the object characteristics at the sensed position and changing as the sensed position changes.

14. The method of claim 11 wherein the object is a hand-held implement.

15. The method of claim 11 wherein the object is a user's hand or portion thereof.

16. The method of claim 11 wherein the rendering step comprises:
   a. computationally generating data representing a holographic fringe pattern; and
   b. generating a holographic image within the view zone from the fringe data.

17. The method of claim 16 wherein the holographic image comprises a series of hololines and exhibits parallax along a single dimension.

18. The method of claim 17 wherein the rendering step further comprises:
   a. storing data representing a plurality of fringe patterns, each fringe pattern corresponding to a different rendering of the image; and
   b. assembling from the stored fringe pattern a composite holographic image that reflects the interaction.

19. The method of claim 17 wherein the sensing step comprises (i) identifing hololines of the image affected by the interaction and (ii), for each affected hololine, specifying a new hololine that reflects the interaction, the altering step comprising changing the identified hololines in accordance with the specifications.

20. The method of claim 12 wherein the holographic image is altered only if the object penetrates at least a threshold distance into the holographic image.

21. The method of claim 11 further comprising the step of causing fabrication of a physical model of the altered holographic image.

* * * * *